UNITED STATES PATENT OFFICE.

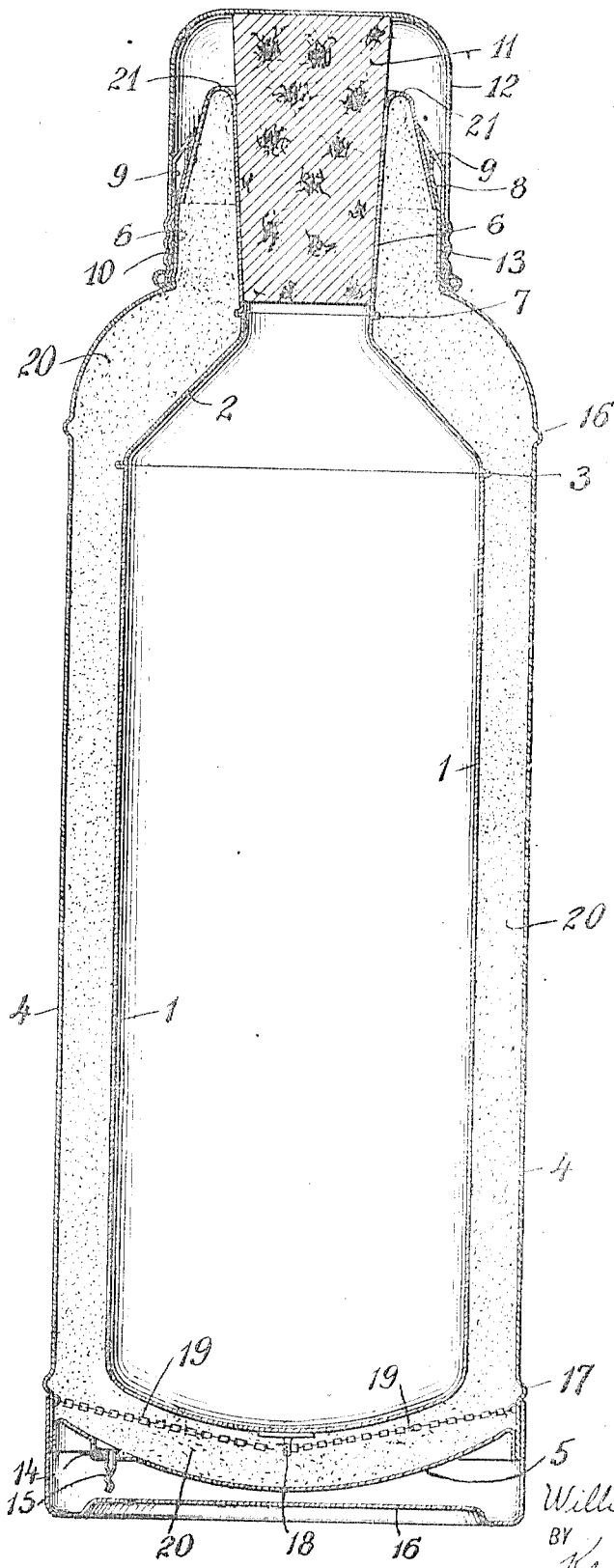

WILLIAM STANLEY, OF GREAT BARRINGTON, MASSACHUSETTS.

HEAT-INSULATED RECEPTACLE.

1,071,817.   Specification of Letters Patent.   Patented Sept. 2, 1913.

Application filed August 5, 1912. Serial No. 713,245.

*To all whom it may concern:*

Be it known that I, WILLIAM STANLEY, a citizen of the United States, and a resident of Great Barrington, Berkshire county, State of Massachusetts, have invented certain new and useful Improvements in Heat-Insulated Receptacles, of which the following is a specification.

My invention relates to heat insulating barriers and more particularly to the insulation of receptacles having an inner shell surrounded by an outer shell with a vacuous space therebetween and commonly known as vacuum bottles etc. My invention, however, may be applied to milk cans and many other devices and arrangements.

The common vacuum receptacle has its shells or walls constructed of glass and accordingly such receptacles are very liable to breakage and cannot withstand hard usage. Moreover, it is found that a very high degree of exhaustion must be maintained in the vacuous space in order to get sufficient heat insulation to make the devices practicable for ordinary uses. Furthermore, because such receptacles are made of glass they are limited in size.

The main objects of my invention are to overcome one or more of these difficulties or disadvantages.

In order to produce bottles which are not liable to breakage it has been suggested that the shells be constructed of metal instead of glass but such bottles have been found entirely unsuccessful because the high degree of exhaustion required is not maintained in the vacuous space, probably because under the greatly reduced pressure the metal gives off gas for a long time which reduces the degree of exhaustion to such an extent that the bottles have not great enough insulating powers to render them usable for most purposes, so that they are entirely impracticable. In order to overcome these difficulties I fill the vacuous space with a finely divided material which will not give off any material amount of gas to materially change the gaseous pressure in the exhausted space. If the space be filled with such a material the same degree of heat insulation may be obtained at a much less reduced gaseous pressure (*i. e.*, much less exhaustion) in the vacuous space, and the said much less reduced pressure will be maintained substantially constant even in a vessel constructed with metallic shells, probably because the metal does not give off a sufficient amount of gas to materially change the reduced gaseous pressure in the vacuous space. I preferably, however, use a finely divided substance which will not only not give off gas in the vacuous space, but will have in addition the power of absorbing any small amount of gas given off to the vacuous space by the metal shells.

I am aware that it has been suggested that the vacuous space of a receptacle of the class in question be filled with a finely divided substance, but in every such case, as far as I am aware, the material has been of a character to give off gas in the vacuous space so that in time the exhaustion and heat insulation powers became so reduced that the receptacles became practically inoperative and entirely unfit for the purposes for which they were intended. It is therefore important that the finely divided material be of a character such that it will not give off any material amount of gas in the vacuous space.

As stated above, a high degree of exhaustion is required to insulate the (glass) vacuum bottle of commerce. In my bottle a much lower vacuum is required, because it is only necessary to exhaust the spaces, voids, or cavities left in the filling material (which voids or cavities are of a microscopic order of magnitude) to a point at which the average distance between all the molecules of the residual gas is approximately equal to the diameter or distance across the voids, high thermal insulation being thus obtained when the order of magnitude of the pressure of the residual gas is one hundred times as great as the residual gaseous pressure in the common exhausted bottle of commerce. In other words, the introduction of properly chosen finely divided filling material may permit the exhaustion to be one hundred times less than is necessary if no such filling is used. A still greater exhaustion will increase to some extent the insulation, but it is rarely necessary. The degree of exhaustion necessary to produce a given insulation depends upon the fineness of division of the material. It will, however, be clear that the use of such a finely divided substance, which will not give off gas or one which will absorb gas in the vacuous space, is of special importance if the receptacle be constructed with metallic shells.

Further objects, features and advantages will more clearly appear from the detailed description given below taken in connection with the accompanying drawing which forms a part of this specification. The drawing shows a vertical section of a vacuum bottle embodying my improvements in one form.

Referring to the drawing, 1 represents an inner steel cylindrical shell provided with a top portion 2 welded thereto at 3. The body of the shell 1 is cylindrical in shape. Extending symmetrically about the inner shell is an outer metal cylindrical shell 4 having a bottom 5 secured thereto. The two shells are connected together entirely around the mouth of the receptacle by means of a steel neck 6 welded to the top 2 at 7, and secured to the outer shell 4 at 8, so as to form a space between the two shells which may be suitably exhausted. The inner surfaces of the shell 1 with its top 2 and neck 6 are covered with any suitable or well known vitreous or vitrified coating such as enamel, etc., or they may be tinned or covered with a protecting varnish or the like, in order that the inside of the vessel may be protected and easily kept clean and sanitary.

Extending about the neck of the bottle is a circular piece 9 having its lower portion threaded at 10. For closing the mouth of the bottle a stopper 11 of cork or other suitable material is inserted therein, and over this is placed a metallic cup-shaped cap 12 threaded at its lower portion 13 for engagement with the screw threads at 10. The bottom 5 is recessed at 14 and provided with a metal tube 15 through which the space between the shells may be exhausted (say to .01—m. m.), and after exhaustion the tube is crimped and soldered to effectively seal the vacuous space. A lower base or bottom 16 is secured to the outer shell 4 after exhaustion to complete the receptacle. The outside surfaces of the receptacle may be nickeled and beads 16 and 17 provided in the shell 4 to strengthen the receptacle. In order to more securely hold the lower end of the inner shell 1 in place with respect to the outer shell, I provide a spider connecting the two shells, which consists principally of a projection 18 secured to the bottom of the inner shell and small links, wires or chains 19 connecting this projection with the outer shell 4. The links, wires or chains 19 are of so high thermal resistance that their heat conducting power is negligible.

Before putting on the bottoms 5 and 16 the space between the shells is filled with a finely powdered material 20 chosen or prepared so as not to give off any material amount of gas at ordinary temperatures at which such receptacles are designed to be used. For this purpose sublimed silica forms a good substance and may be used with success. By filling the vacuous space with this material a very high degree of heat insulation may be obtained with a much less reduction of gaseous pressure than ordinarily employed, as any small amount of gas given off by the metallic walls under these conditions will not materially affect the gaseous pressure and corresponding heat insulation.

Obviously other substances may be used to fill the vacuous space. Even materials which are ordinarily good heat conductors if in sufficiently finely divided condition, may be used. Such substances as metallic oxids, finely divided metals, etc., may be used, the nature of the filling substance being quite immaterial provided it is sufficiently divided and will not give off gases (including vapors) after the exhaustion.

If desired, a finely divided substance may be used which will not only not give off gas to the vacuous space but will have an appetite for gas or the power of absorbing gas under the conditions of use. A suitable material for this purpose is finely divided carbon which has been highly heated to remove occluded gases and also heated in the vacuous space at the time of exhaustion to a temperature higher than the temperature at which the receptacle is to be generally used. The carbon so treated will thereafter absorb any small amounts of gas given off to the vacuous space by or from the metallic shells and thus aid in keeping up the exhaustion necessary for proper insulation. The carbon will so act even when hot materials are placed in the receptacle, since it is necessary to heat the carbon nearly to the temperature at which it was heated at the time of exhaustion before it will cease to absorb gases from the vacuous space. Obviously various other gas absorbing materials may be employed with success.

Successful receptacles constructed of metallic shells may be produced by the use of such gas absorbing materials in the vacuous space even although the space is not filled with them. Since however in such case the degree of exhaustion must be much greater in order to produce the same degree of heat insulation I prefer to practically fill the vacuous space with the finely divided substance. A certain amount of heat transmission through the sides and neck of a receptacle of the class described is usually permissible but by reducing the losses through the neck the same insulation value of the receptacle may be maintained with a greater gaseous pressure (less exhaustion) in the vacuous space whereby any small amount of gas which may be given off to the space by the metallic parts will not make such a great percentage of change in the gaseous pressure and the degree of insulation is more nearly maintained constant. In order to reduce the losses through the neck to bring about this result, I provide the receptacle with a long narrow neck 6 extending from the seam 7 to the top 21. The neck though of metal, yet being long and narrow has such a high thermal resistance that the losses therethrough are small. By increasing the amount of exhaustion however, the high resistance feature of the neck may be omitted.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects and my invention in its broader aspects may be found useful in many other applications thereof.

Having fully and clearly described my invention, what I claim as new and desire to secure by Letters Patent, is:

1. A heat insulating barrier comprising two metallic walls suitably connected and spaced apart, the space between said walls being filled with finely divided material which will absorb gas at ordinary temperatures and reduced pressures, the said space being exhausted to such a degree as to greatly reduce the conductivity for heat between the two metallic walls.

2. A heat insulated receptacle having an inner metallic shell with a vitreous coating on its inner surface and an outer metallic shell extending about the inner shell and spaced therefrom and connected to the inner shell at the mouth of the receptacle by a metallic neck of high thermal resistance, the space between said shells being filled with finely divided material substantially incapable of giving off gas but which will absorb gas at ordinary temperatures and reduced pressures, and the said space also being exhausted to such a degree as to greatly reduce the conductivity for heat between the two shells.

3. A heat insulating barrier comprising two walls suitably connected and spaced apart to form a vacuous space therebetween, said space containing finely divided material substantially incapable of giving off gas at ordinary temperatures and reduced pressures, and the said space being exhausted to such a degree as to greatly reduce the conductivity for heat between the two walls.

4. A heat insulated receptacle having an inner metallic shell and an outer metallic shell extending about the inner shell and spaced therefrom and connected to the inner shell at the mouth of the receptacle by a metallic neck of high thermal resistance, and the space between said shells being filled with finely divided material substantially incapable of giving off gas at ordinary temperatures and reduced pressures, and the said space also being exhausted to such a degree as to greatly reduce the conductivity for heat between the two shells.

5. A heat insulated receptacle having an inner metallic shell and an outer metallic shell extending about the inner shell and spaced therefrom and connected to the inner shell at the mouth of the receptacle, the space between said shells being filled with finely divided material incapable of giving off gas at ordinary temperatures and reduced pressures, and the said space also being exhausted to such a degree as to greatly reduce the conductivity for heat between the two shells.

6. A heat insulated receptacle having an inner shell, and an outer shell extending about the inner shell and spaced therefrom and connected to the inner shell at the mouth of the receptacle, and the space between said shells being filled with finely divided material which will absorb gas at ordinary temperatures and at the reduced pressures of the space, the said space also being exhausted to such a degree as to greatly reduce the conductivity for heat between the two shells.

7. A heat insulated receptacle having an inner shell, and an outer metallic shell extending about the inner shell and spaced therefrom and connected to the inner shell at the mouth of the receptacle by a neck of high thermal resistance, and the space between said shells being filled with finely divided material which will absorb gas at ordinary temperatures and reduced pressures, and the said space also being exhausted to such a degree as to greatly reduce the conductivity for heat between the two shells.

8. A heat insulating barrier comprising two walls suitably connected and spaced apart to form a vacuous space therebetween, said space being filled with finely divided material substantially incapable of giving off gas at ordinary temperatures and reduced pressures, and the said space being exhausted to such a degree as to greatly reduce the conductivity for heat between the two walls.

9. A heat insulated receptacle having an inner metallic shell and an outer metallic shell extending about the inner shell and spaced therefrom and connected to the inner shell at the mouth thereof, the space between said shells being exhausted and filled with a finely divided material which has been heated in the space at the time of exhaustion to a temperature higher than the ordinary temperatures at which the receptacle is to be generally used, whereby the material is adapted to absorb gas from the space at ordinary temperatures at which the receptacle is to be generally employed.

10. A heat insulated receptacle having an interior metallic shell and an exterior metallic shell extending about the inner shell and spaced therefrom and connected to the inner shell at the mouth of the receptacle by a neck of high thermal resistance, the space between said shells containing finely divided material which has been heated in the space at the time of exhaustion to a temperature higher than the ordinary temperatures at which the receptacle is to be generally used, whereby the material is adapted to absorb gas from the space at ordinary temperatures at which the receptacle is to be generally used, said space being exhausted to such a degree as to greatly reduce the conductivity for heat between the two shells.

11. A heat insulated receptacle having an interior metallic shell and an exterior metallic shell extending about the inner shell and spaced therefrom and connected to the inner shell at the mouth of the receptacle, the space between said shells containing finely divided material which has been heated to a temperature higher than the ordinary temperatures at which the receptacle is to be generally used, whereby the material is adapted to absorb gas from the space at ordinary temperatures at which the receptacle is to be generally used, said space being exhausted to such a degree as to greatly reduce the conductivity for heat between the two shells.

12. A heat insulated receptacle comprising metallic walls, suitably joined, embracing a vacuous space filled with finely divided material which will not give off gas to the space at ordinary temperatures, said space being exhausted to such a degree as to greatly reduce the conductivity for heat across said space.

13. A heat insulated receptacle comprising spaced metallic walls suitably joined to form a vacuous space, said space being filled with material leaving voids or cavities of a microscopic order of magnitude and the number of which is practically infinitely large, said material being of a character not to give off gas to the space between the walls and said space being exhausted of gas to such an extent as to separate the molecules of gas by an average distance at least as great as the average distance across said voids or cavities.

14. A heat insulated receptacle comprising spaced walls, suitably joined, to form a vacuous space therebetween, said space being filled with a finely divided substance which will not give off gas in the vacuous space at ordinary temperatures and which leaves voids or cavities of a microscopic order of magnitude and the number of which is practically infinitely large, said voids or cavities being exhausted of gas only to about such an extent as to separate the molecules of gas by an average distance greater than the average distance across said voids or cavities.

15. A heat insulating barrier comprising two walls suitably connected and spaced apart to form a vacuous space therebetween, said space containing finely divided material which will absorb gas at the ordinary temperatures and reduced pressures, the said space being exhausted to such a degree as to greatly reduce the conductivity for heat between the two walls.

In testimony whereof, I have signed my name to this specification, in the presence of two subscribing witnesses.

WILLIAM STANLEY.

Witnesses:
C. P. RANDOLPH,
F. G. LARAMEE.